United States Patent [19]
Bates et al.

[11] Patent Number: 6,049,334
[45] Date of Patent: Apr. 11, 2000

[54] METHOD AND SYSTEM FOR GRAPHICALLY INDICATING THE ACTIVITY OF A PLURALITY OF USERS WITHIN A SHARED DATA COLLECTION

[75] Inventors: Cary Lee Bates; Jerry Allen Blades; Paul R. Day; Harvey Gene Kiel; Jeffrey Michael Ryan, all of Rochester, Minn.

[73] Assignee: International Business Machines Corporation, Armonk, N.Y.

[21] Appl. No.: 08/170,569

[22] Filed: Dec. 20, 1993

[51] Int. Cl.⁷ ........................................ G06T 1/00
[52] U.S. Cl. ............................. 345/332; 345/341
[58] Field of Search .................... 395/153, 154, 395/155, 145.52, 158; 380/4, 25; 345/329, 331, 332, 330, 341

[56] References Cited

U.S. PATENT DOCUMENTS

| | | | |
|---|---|---|---|
| 5,107,443 | 4/1992 | Smith et al. | 395/158 |
| 5,337,407 | 8/1994 | Bates et al. | 395/153 |
| 5,339,388 | 8/1994 | Bates et al. | 395/153 |
| 5,339,389 | 8/1994 | Bates et al. | 395/153 |

OTHER PUBLICATIONS

Cowart, "Mastering Windows 3.0", Sybex, pp. 18–21, 1990.

*Primary Examiner*—Joseph H. Feild
*Attorney, Agent, or Firm*—Brian F. Russell; Andrew J. Dillon

[57] ABSTRACT

A display window is displayed in association with at least one scroll bar at a terminal associated with a first user. Along the shaft of one or more scroll bars, a distinctive visual location cue, such as a line in a color associated with a second user, is displayed to indicate the relative location within the shared data collection of the current and historical activity of a second user. A user may temporarily prohibit manipulation of a region within the shared data collection by other users by establishing a "lock" on the region. A lock region may comprise several lines of text, a portion of a graphical object, or other data within the shared data collection. To indicate the location of lock regions, lock region location cues are also displayed along the scroll bar. In addition to indicating the location of lock regions, lock region location cues also indicate which user has established a lock region via a distinctive display attribute, preferably a distinctive color associated with the user who established the lock region. The location of a lock region is also indicated within the display area of a window by displaying the lock region with the same distinctive display attribute as the lock region location cue. In addition, when a cursor associated with a user prohibited from manipulating a lock region is located within the lock region, an aspect of the cursor, such as its shape, is altered. A preferred embodiment displays a representation of a key rather than a standard cursor to indicate to a user that his cursor is within a lock region.

17 Claims, 5 Drawing Sheets

METHOD AND SYSTEM FOR GRAPHICALLY INDICATING THE ACTIVITY OF A PLURALITY OF USERS WITHIN A SHARED DATA COLLECTION

BACKGROUND OF THE INVENTION

1. Technical Field

The present invention relates in general to a collaborative computer-based system and in particular to data processing within a collaborative computer-based system. Still more particularly the present invention relates to a method and system for graphically indicating the activity of a plurality of users within a shared data collection within a collaborative data processing system.

2. Description of the Related Art

A collaborative system may be defined as a real-time computer-based environment coordinating individual efforts toward completion of a task. The task may be a document, production schedule, computer program, product design, or any other task, solution of which is aided by the simultaneous effort of more than one person. Typically, a computer network is utilized to coordinate the work of many users. The subject of the effort of the users of the computer network is generally structured as one or more shared data collections stored in memory which is accessible over the network. To construct or modify the shared data collections, users typically employ a software application, such as a text editor or data base management facilities. A user accesses the shared data collection through multiuser interface facilities which are supported by the network.

A shared data collection is an object which is simultaneously accessible to a plurality of users over the network. Such data collections may include, for example, word processing documents, graphical images or spreadsheets. In order to prevent simultaneous editing of a region within a shared data collection by multiple users, a user may establish a "lock" on a selected region which temporarily prohibits other users from manipulating the locked region. Allowing simultaneous access to a shared data collection in this manner enables work to be efficiently performed by a plurality of users since revisions and new data may easily be shared from remote locations without conflict between users.

The benefits of utilizing a collaborative data processing system are further enhanced by implementing a Graphical User Interface (GUI) to simplify the interface between users and the system. Displaying a window or viewport containing a scrollable portion of a shared data collection is one well known graphical interface technique that allows a user to interact with a display of data in a graphical and intuitive manner. Typically, the portion of the shared data collection which is displayed within the window is controlled by at least one scroll bar displayed in association with the window. A scroll bar typically includes a scroll box, a shaft and scroll buttons. In addition to controlling the display of scrollable data within a window, a scroll bar also indicates to a user his or her relative position within a shared data collection by the position of the scroll box relative to the length of the shaft.

However, despite the interface enhancement provided by a Graphical User Interface, having a plurality of simultaneous users within a shared data collection may confuse a user attempting to coordinate his efforts with those of other users. A user, while knowing his own location, may have difficulty in locating other users within the shared data collection, especially if the shared data collection is large. A user may also have difficulty determining the location of locked regions within the shared data collection. Thus, a user may waste time searching for other users within a shared data collection or become frustrated while attempting to edit a locked region within the shared data collection.

Therefore, it should be apparent that a need exists for a method and system which graphically indicates to a user of a collaborative data processing system the activity of a plurality of users within a shared data collection.

SUMMARY OF THE INVENTION

It is therefore one object of the present invention to provide an improved collaborative computer-based system.

It is another object of the present invention to provide an improved method and system for data processing within a collaborative computer-based system.

It is yet another object of the present invention to provide an improved method and system for graphically indicating the activities of a plurality of users within a shared data collection within a collaborative data processing system.

The foregoing objects are achieved as is now described. A display window is displayed in association with at least one scroll bar at a terminal associated with a first user. Along the shaft of one or more scroll bars, a distinctive visual location cue, such as a line in a color associated with a second user, is displayed to indicate the relative location within the shared data collection of the current or historical activity of a second user. A user may temporarily prohibit manipulation of a region within the shared data collection by other users by establishing a "lock" on the region. A lock region may comprise several lines of text, a portion of a graphical object, or other data within the shared data collection. To indicate the location of lock regions, lock region location cues are also displayed along the scroll bar. In addition to indicating the location of lock regions, lock region location cues also indicate which user has established a lock region via a distinctive display attribute, preferably a distinctive color associated with the user who established the lock region. The location of a lock region is also indicated within the display area of a window by displaying the lock region with the same distinctive display attribute as the lock region location cue. In addition, when a cursor associated with a user prohibited from manipulating a lock region is located within the lock region, an aspect of the cursor, such as its shape, is altered. A preferred embodiment displays a representation of a key rather than a standard cursor to indicate to a user that his cursor is within a lock region.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
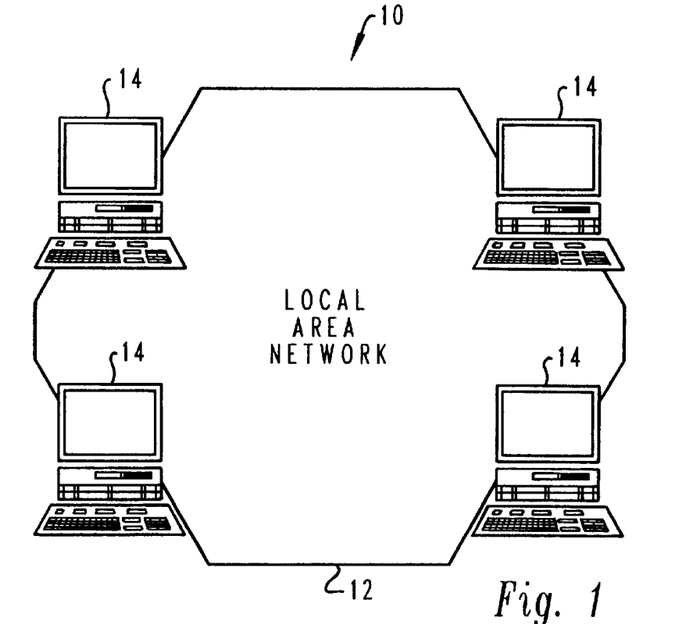
FIG. 1 is a pictorial representation of a local area network which may be utilized to implement the method and system of the present invention.

With reference now to the figures and in particular with reference to FIG. 1, there is depicted a pictorial representation of a local area network 10 which may be utilized to implement the method and system of the present invention. As is illustrated, local area network 10 supports a collaborative computer-based editing system relating to a shared data collection stored on a server. Local area network 10 provides data communication over a transmission channel 12 between a plurality of computers 14. Computers 14 within the depicted system are preferably IBM computers, such as the International Business Machines Corporation IBM Application System/400, an IBM Personal System/2 or other similar system. As those skilled in the art will appreciate, each computer 14 generally includes a keyboard, a video display device, and a graphical pointing device, such as a mouse. One computer 14, which may be a larger computer such as IBM Application System/400, operates as a server for network 10 in situations in which the remaining computers are either terminals or personal computers.

Figure 2:
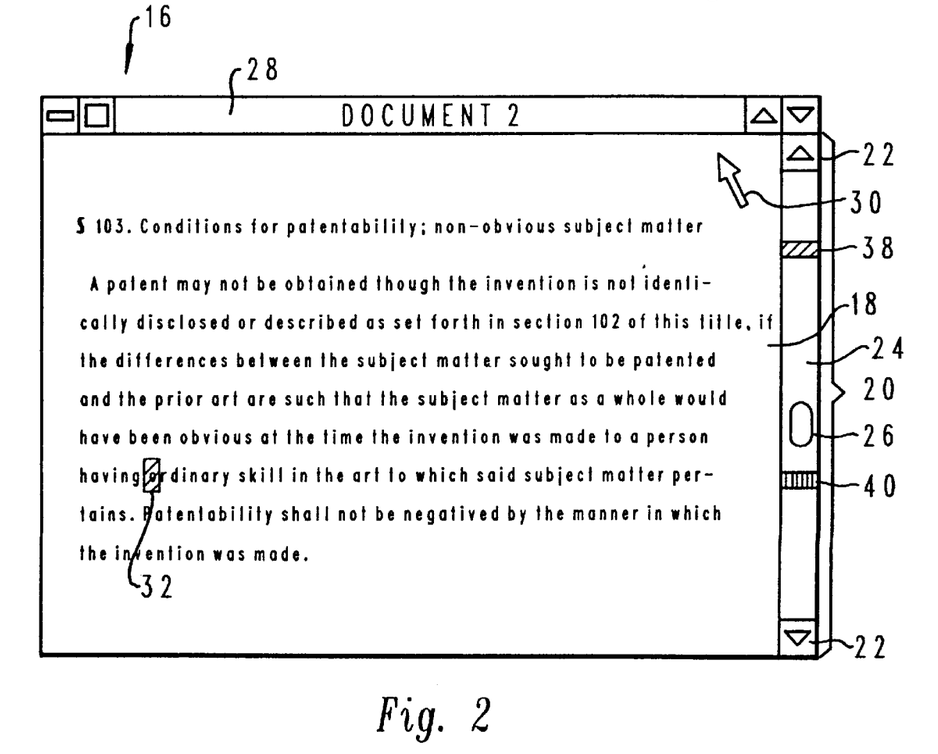
FIG. 2 is a pictorial representation of the display of a window in which the location of multiple users within a shared data collection is graphically indicated along a scroll bar in accordance with the method and system of the present invention.

Referring now to FIG. 2, there is depicted a pictorial representation of the display of window 16 within the video display device of one of computers 14 associated with a first user. Window 16 contains display area 18, within which a portion of a shared data collection is displayed, and title bar 28, which identifies the shared data collection accessed by the user. In association with window 16, scroll bar 20, comprised of scroll buttons 22, shaft 24 and scroll box 26, is displayed. Locally generated graphical pointer 30 is displayed and is available for operating control features of window 16, such as scroll box 26. Utilizing graphical pointing device 30, the first user may select the portion of the shared data collection displayed within display area 18 by selecting scroll buttons 22, by performing a "drag and drop" operation on scroll box 26, or by selecting a position on shaft 24. Cursor is also displayed within display area 18. The location of cursor 32, associated with the first user, is indicated by the position of scroll box 26 relative to shaft 24.

As those skilled in the art will appreciate, additional cursors assigned to other users within a shared data collection may be present within a shared data collection. Thus, cursors 34 and 36 (not shown) may be associated with a second and third user and the locations of cursors 34 and 36 may then be graphically indicated to the first user, in accordance with the method and system of the present invention, by the provision of visual location cues 38 and 40 along shaft 24. In the depicted embodiment of the present invention, visual location cues 38 and 40, have graphically distinctive display attributes, as indicated by cross-hatching.

In a preferred embodiment, visual location cues 38 and 40 are each displayed with distinctive colors which relate to cursors 34 and 36, respectively.

Alternatively, visual location cues 38 and 40 may be utilized to indicate a history of cursor locations, rather than actual current cursor locations. That is, location cues 38 and 40 may be utilized to indicate those areas within the shared data collections which have been "viewed" by other users, with the distinctive colors being indicative of the frequency of viewing, or the elapsed time which has occurred since that portion of the shared data collection has been viewed by another user.

Figures 3, 6:
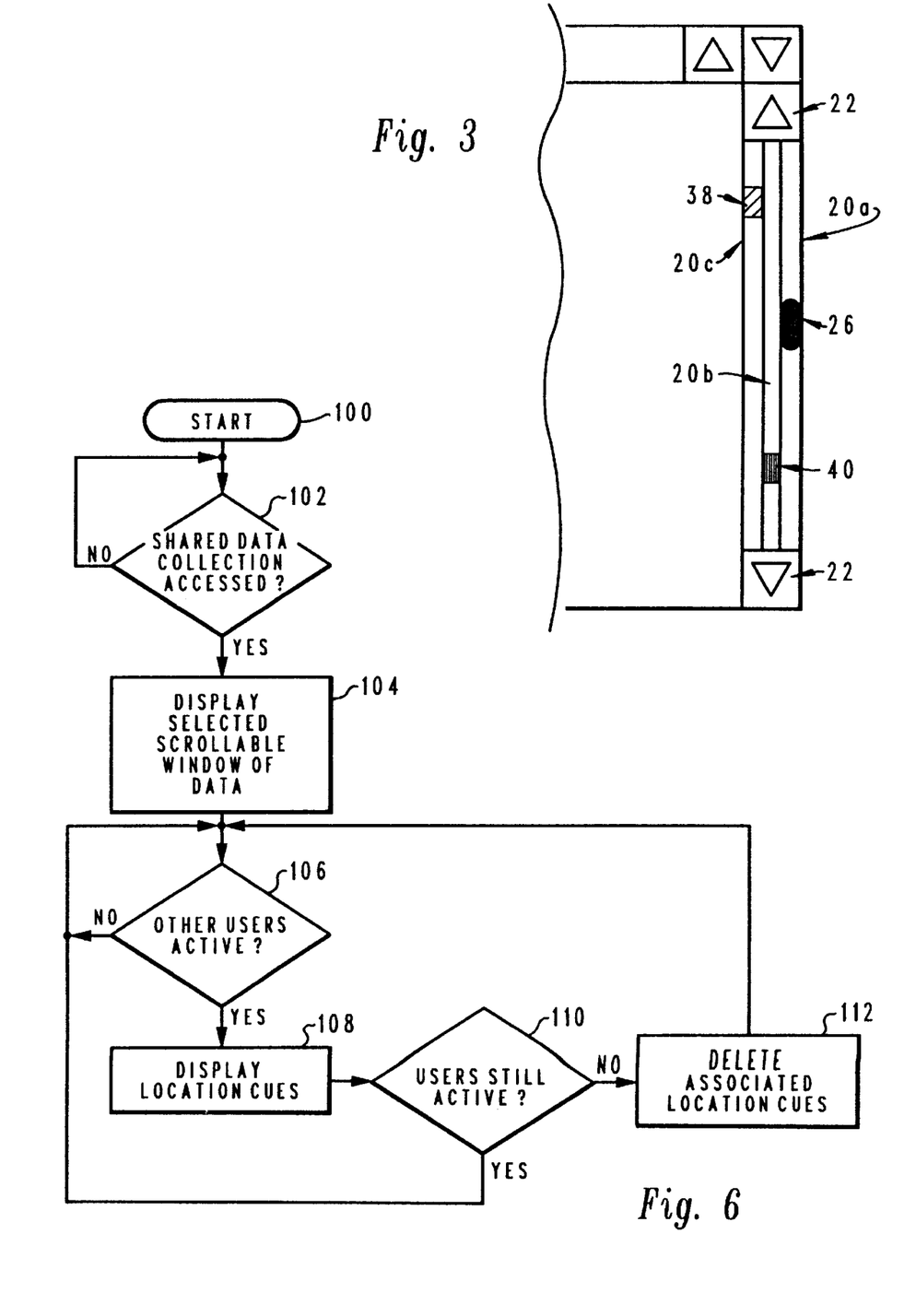
FIG. 3 is a pictorial representation of an alternate embodiment of the scroll bar of FIG. 2, which may be utilized to indicate the location of multiple users within a shared data collection.
FIG. 6 is a high level logic flowchart illustrating a process for providing graphic location cues in accordance with the method and system of the present invention.

Referring now to FIG. 3, there is depicted a pictorial representation of an alternate embodiment of the scroll bar of FIG. 2, which may be utilized to indicate the location of the multiple users within a shared data collection. As illustrated, FIG. 3 depicts three separate scroll bars 20a, 20b, and 20c. In this embodiment of the present invention, a scroll bar is depicted for each user who is active within the shared data collection. Thus, location cue 38 is displayed within scroll bar 20c, location cue 40 is displayed within scroll bar 20b and scroll box 26 is displayed within scroll bar 20. In this manner, the current or historical locations associated with multiple users within the shared data collection may be graphically depicted.

Figure 4:
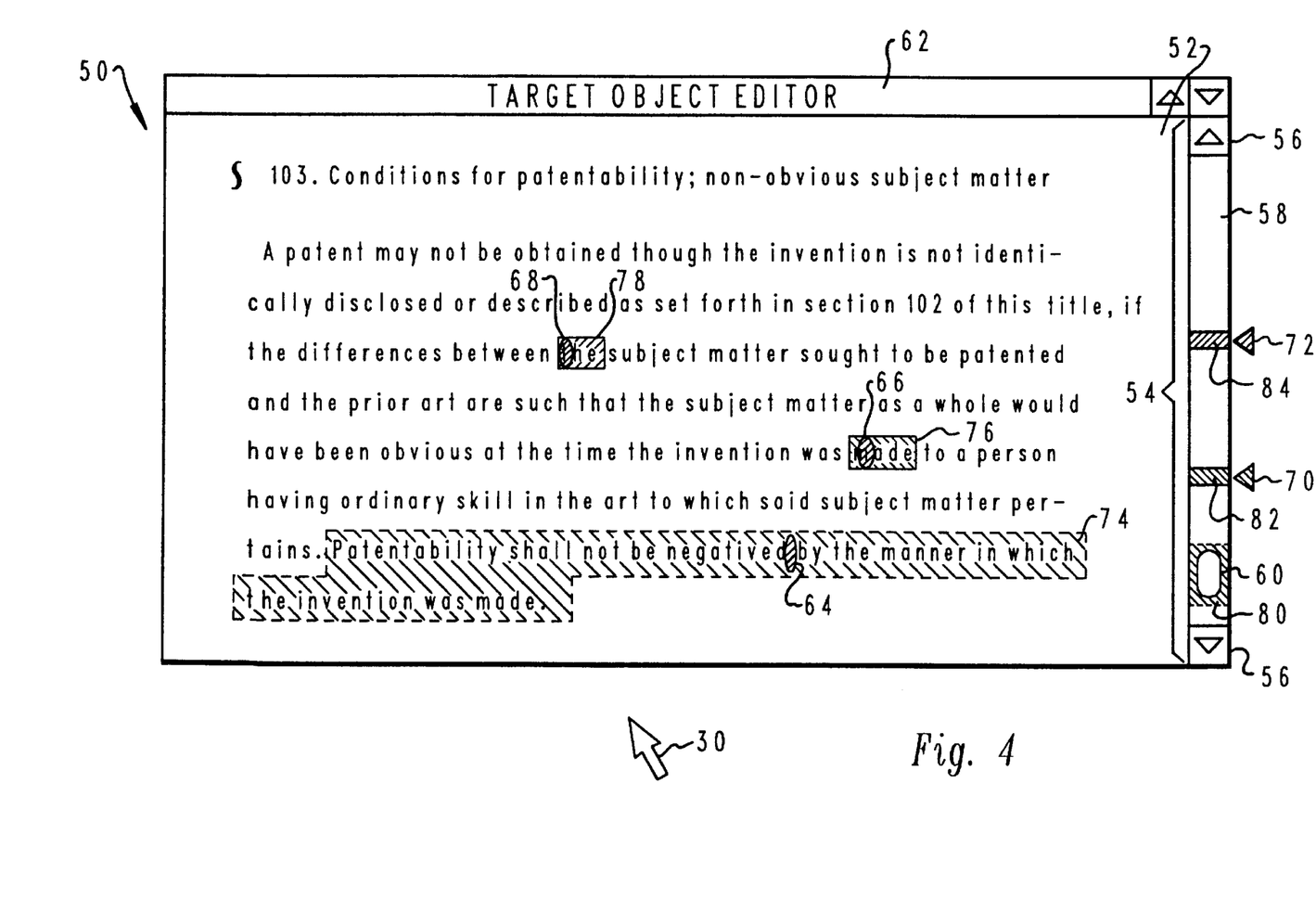
FIGS. 4 and 5 are pictorial representations of the display of a window in which the location of users and of locked regions within a shared data collection are graphically indicated according to the method and system of the present invention.

With reference now to FIG. 4, there is depicted a pictorial representation of the display of window 50 within one of computers 14 associated with the first user. Like window 30 of FIG. 2, window 50 contains display area 52, within which a portion of a shared data collection is displayed; scroll bar 54, which is comprised of scroll buttons 56, shaft 58, and scroll box 60; and title bar 62, which identifies the shared data collection accessed by the user. Unlike FIG. 2, for purposes of illustration, multiple cursors associated with different users are depicted within window 50; however, those skilled in the art will appreciate that the method and system of the present invention will find equal application in situations in which the cursors associated with other users of the shared data collection are not depicted within the portion of the shared data collection displayed within window 50. Thus, cursors 64, 66 and 68, which are associated with a first, second and third users of the shared data collection, are displayed within display area 52. As in FIG. 2, the location of the first user is indicated by the position of scroll box 60, relative to shaft 58. In the depicted embodiment, the locations of cursors 66 and 68 are graphically indicated to the first user by the position along shaft 58 of visual location cues 70 and 72, which are triangles having the distinctive display attributes of their associated cursors. In a preferred embodiment, visual location cues 70 and 72 are displayed with the distinctive colors associated with cursors 66 and 68 respectively.

The three users, whose assigned cursors 64, 66, and 68 are depicted within display area 52, have established lock regions 74, 76, and 78 within the shared data collection. As those skilled in the art will appreciate, a "lock region" is utilized by a user to ensure that other users may not manipulate data within that region during the period of time which the lock exists. Therefore, manipulation of lock regions 74, 76, and 78 is temporarily restricted to the user who established the lock region. The location of lock regions 74, 76, and 78 within the shared data collection is also indicated by the position of lock region location cues 80, 82, and 84.

Thus, the activity of a particular user is graphically indicated to other users by displaying the user's cursor, a visual location cue, lock regions established by the user, and lock region location cues, each having a distinctive display attribute associated with a particular user. For example, if the color blue were assigned to the third user, cursor 68 and visual location cue 72 may be displayed in bright blue, while lock region 78 and lock region location cue 84 are displayed in dark blue. In computer systems not supporting color, all cues may be displayed with the same gray scale shading, or as depicted in FIG. 4, with the same cross-hatch pattern.

Figure 5:
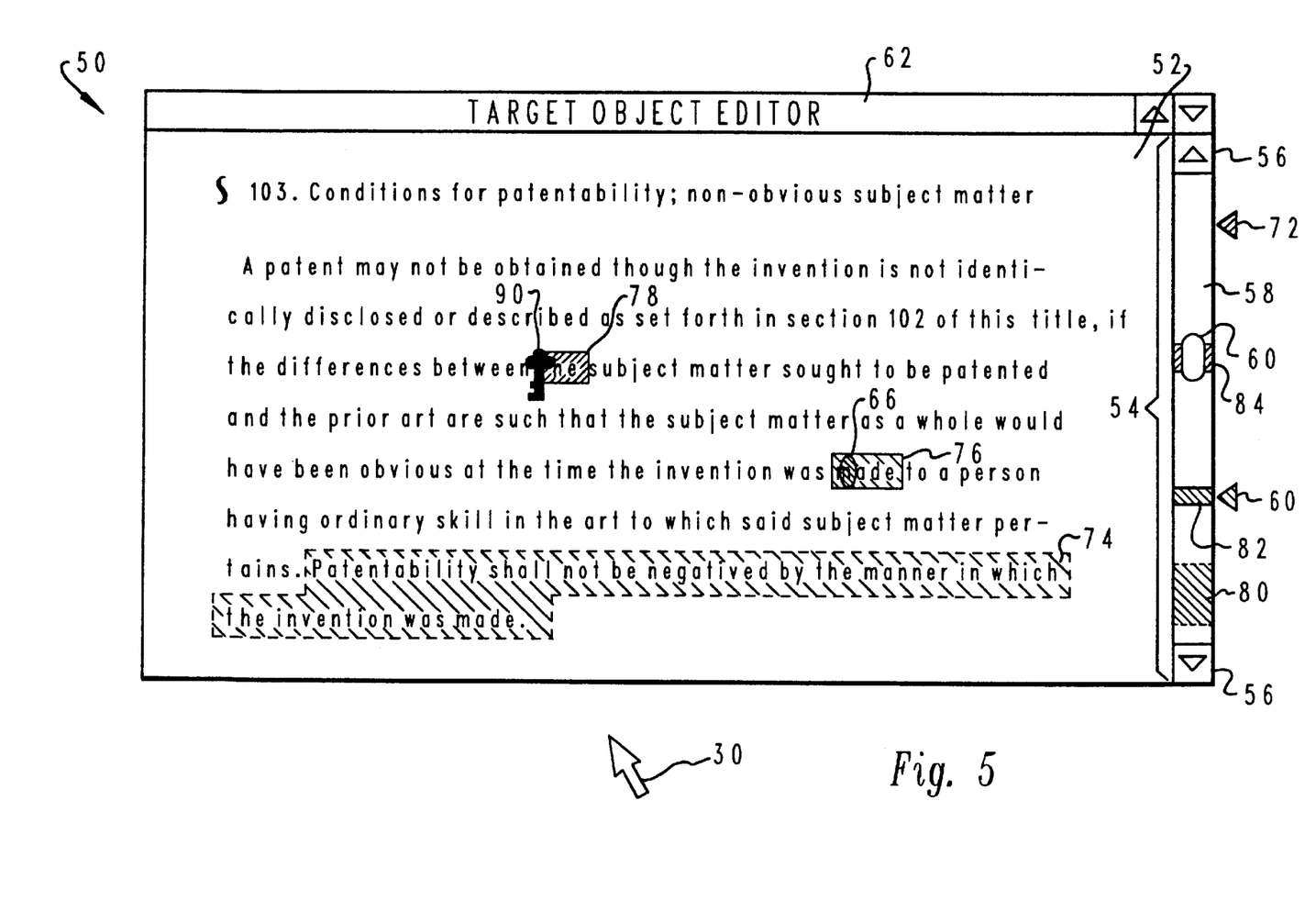

Referring now to FIG. 5, there is depicted a pictorial representation of window 50 also shown in FIG. 4. FIG. 5 illustrates an additional feature of the present invention that alerts a first user when his or her cursor is within a lock region that the first user is prohibited from manipulating. Cursor 68 (not shown) is located outside the portion of the shared data collection displayed within display area 52, as indicated by the position of visual location cue 72. Cursor 90, associated with the first user, is located within lock region 78, established by the third user. The display of cursor 90 in the shape of a key indicates to the first user that lock region 78 is protected from manipulation originating from the first user.

With reference now to FIG. 6, there is depicted a high level logic flowchart which illustrates the method of the present invention. As depicted, the process begins at block 100 and thereafter passes to block 102. Block 102 illustrates a determination of whether or not a shared data collection has been accessed by a user. If not, the process merely iterates until such time as a shared data collection has been accessed by a user.

Still referring to block 102 in the event a shared data collection has been accessed by a user, the process passes to block 104. Block 104 illustrates the displaying of a selected scrollable window of data from the shared data collection in the manner depicted within FIGS. 2, 4, or 5. Next, the process passes to block 106. Block 106 illustrates a determination of whether or not other users are active within the shared data collection. If not, the process merely iterates until such time as other users become active within the shared data collection.

Still referring to block 106, in the event other users are active within the shared data collection, the process passes to block 108. Block 108 illustrates the displaying of graphic location cues associated with the activity of other users within the scroll box associated with the displayed window. Next, the process passes to block 110. Block 110 illustrates a determination of whether or not other users are still active within the shared data collection. If so, the process returns to block 106 in an iterative fashion to continue to display graphic location cues associated with the relative location of the activity of other users within the shared data collection. Alternately, in the event a user is no longer active within the shared data collection, the process passes to block 112. Block 112 illustrates the deletion of the associated graphic location cue for any user no longer active within the shared data collection and the process then returns, in an iterative fashion, to block 106.

Figure 7:
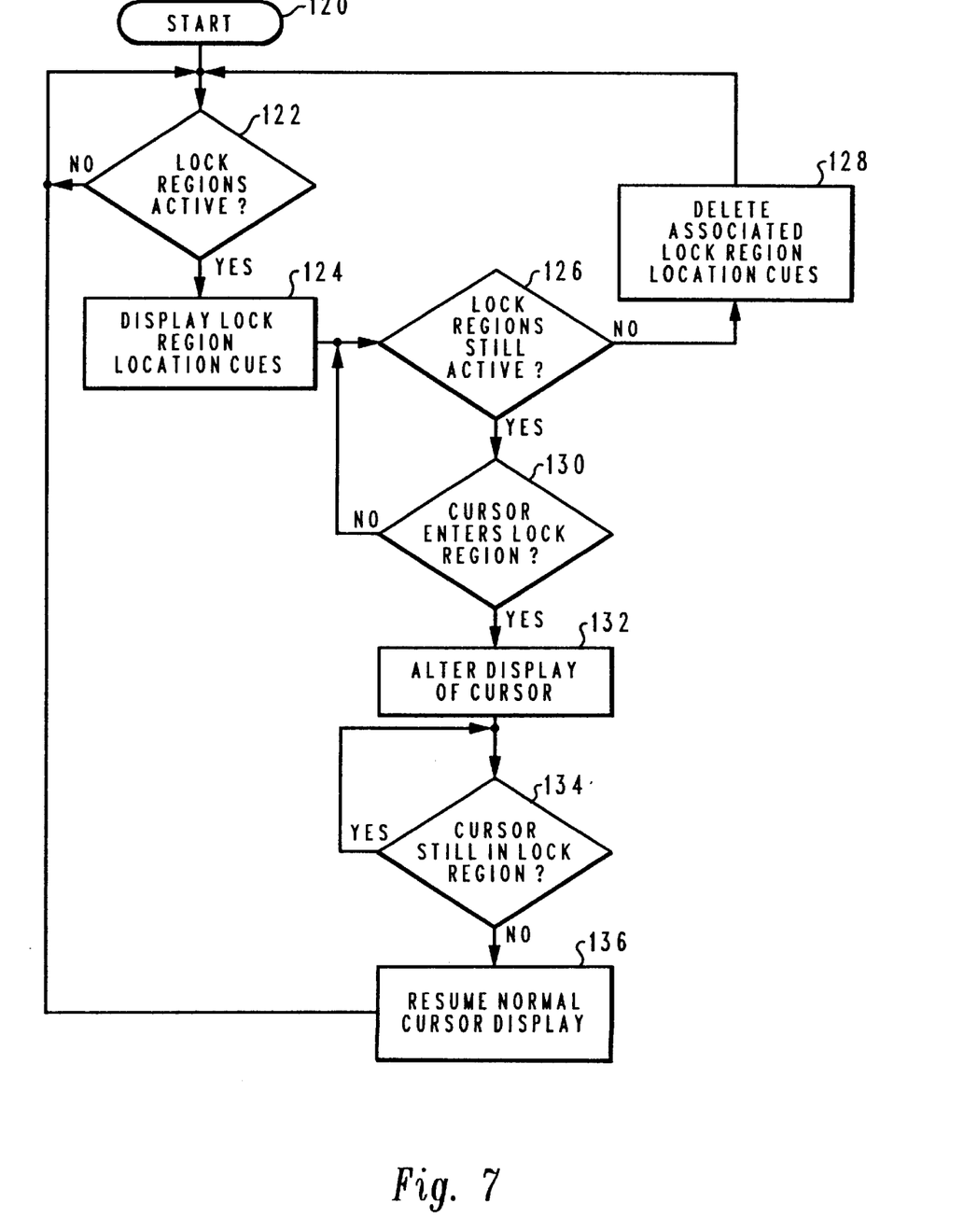
FIG. 7 is a high level logic flowchart illustrating a process for providing graphic lock region location cues in accordance with the method and system of the present invention.

Finally, with reference to FIG. 7, there is depicted a high level logic flowchart which illustrates a process for providing graphic lock region location cues in accordance with the method and system of the present invention. As illustrated, the process begins at block 120 and thereafter passes to block 122. Block 122 illustrates a determination of whether or not lock regions are active within the shared data collection. If not, the process merely iterates until such time as a lock region becomes active within the shared data collection. As described above, a "lock region" is a region established by a user within a shared data collection to prevent other users from taking action within that region.

Still referring to block 122, once a lock region has become active within the shared data collection, the process passes to block 124. Block 124 illustrates the displaying of a graphic lock region location cue within the scroll box associated with the display window, as illustrated within FIG. 5. Next, the process passes to block 126. Block 126 illustrates a determination of whether or not the lock regions within the shared data collection are still active. If not, block 128 illustrates the deletion of an associated graphic lock region location cue and the process returns, in an iterative fashion, to block 122.

Still referring to block 126, in the event the lock regions within the shared data collection are still active, the process passes to block 130. Block 130 illustrates a determination of whether or not an alternative user's cursor has entered a lock region and if not, the process returns to block 126 in an iterative fashion. However, in the event the cursor associated with an alternate user enters a lock region, the process passes to block 132 which illustrates the altering of the display of the cursor in the manner depicted within FIG. 5. Thereafter, the process passes to block 134.

Block 134 illustrates a determination of whether or not the cursor is still within a lock region associated with another user and if so, the process merely iterates. However, once the cursor has been removed from a lock region associated with another user, the process passes to block 136. Block 136 illustrates the resuming of the normal cursor display and the process then returns to block 122, in an iterative fashion.

Upon reference to the foregoing those skilled in the art will appreciate that the method and system of the present application provide a technique whereby the presence and relative location of other users within a shared data collection may be graphically and intuitively determined by a user and wherein the presence of lock regions within that shared data collection provided by other users may also be graphically depicted. In this manner, the sharing of data within a shared data collection may be rendered much more efficient.

Although the present invention has been discussed in reference to a shared data collection comprised of text, those skilled in the art will realize that the shared data collection may be comprised of graphical images, spreadsheets, or other data form that may be accessed by a plurality of users in a shared data collection.

Upon reference to the foregoing those skilled in the art will appreciate that the Applicants herein have provided a novel method and system which may be utilized for graphically indicating the activity of a plurality of users within a shared data collection. While the invention has been particularly shown and described with reference to a preferred embodiment, it will be understood by those skilled in the art that various changes in form and detail may be made therein without departing from the spirit and scope of the invention.

What is claimed is:

1. A method in a multi-media collaborative data processing system which includes a shared data collection simultaneously accessible by a plurality of users of said system and a network connecting a plurality of terminals for communication, wherein each terminal has a display system and a user input device, of graphically indicating the relative location of said plurality of users within said shared data collection, comprising the steps of:

presenting a display window at a terminal associated with a first user;

displaying in association with said display window a moveable control icon constrained to move along a line parallel to an edge of said display window;

presenting within said display window a portion of said shared data collection, wherein said portion of said shared data collection is selected in response to a position of said movable control icon along said line; and displaying a visual location cue along said line, said visual location cue indicative of a relative location of a corresponding portion of said shared data collection displayed at a terminal associated with a second user.

2. The method of graphically indicating the relative location of said plurality of users within said shared data collection according to claim 1, wherein said step of displaying in association with said display window a moveable control icon comprises the step of displaying in association with said display window a vertical scroll bar.

3. The method of graphically indicating the relative location of said plurality of users within said shared data collection according to claim 1, wherein said step of displaying in association with said display window a movable control icon comprises the step of displaying in association with said display window a plurality of vertical scroll bars and wherein said step of displaying a visual location cue comprises the step of displaying a visual location cue along a second one of said plurality of vertical scroll bars indicative of a relative location of a corresponding portion of said shared data collection displayed at a terminal associated with a second user.

4. The method of graphically indicating the relative location of said plurality of users within said shared data collection according to claim 2, wherein said step of displaying a visual location cue along said line comprises the step of displaying a portion of said vertical scroll bar in a visually distinctive color associated with said second user.

5. A method in a multi-media collaborative data processing system which includes a shared data collection simultaneously accessible by a plurality of users of said system and a network connecting a plurality of terminals for communication, wherein a user may temporarily prohibit manipulation of a region within said shared data collection by other users and wherein each terminal has a display system and a user input device, of graphically indicating the relative location of regions within said shared data collection which a user has temporarily prohibited other users from manipulating, comprising the steps of:

presenting a display window at a terminal associated with a first user;

displaying in association with said display window a moveable control icon constrained to move along a line parallel to an edge of said display window;

presenting within said display window a portion of said shared data collection, wherein said portion of said shared data collection is selected in response to a position of said movable control icon along said line; and displaying a visual location cue along said line, said visual location cue indicative of a relative location of a region within said shared data collection which a user has temporarily prohibited other users from manipulating.

6. The method of graphically indicating the relative location of regions within said shared data collection which a user has temporarily prohibited other users from manipulating according to claim 5, further comprising the step of altering an aspect of a cursor associated with a first user in response to said first user locating said cursor within said region within said shared data collection which a second user has temporarily prohibited other users from manipulating.

7. The method of graphically indicating the relative location of regions within said shared data collection which a user has temporarily prohibited other users from manipulating according to claim 6, wherein said step of altering an aspect of a cursor associated with said first user comprises the step of varying a shape of said cursor.

8. The method of graphically indicating the relative location of regions within said shared data collection which a user has temporarily prohibited other users from manipulating according to claim 5, wherein said step of displaying in association with said display window a moveable control icon comprises the step of displaying in association with said display window a vertical scroll bar.

9. The method of graphically indicating the relative location of said plurality of users within said shared data collection according to claim 5, wherein said step of displaying in association with said display window a movable control icon comprises the step of displaying in association with said display window a plurality of vertical scroll bars and wherein said step of displaying a visual location cue comprises the step of displaying a visual location cue along a second one of said plurality of vertical scroll bars indicative of a relative location of a region within said shared data collection which a user has temporarily prohibited other users from manipulating.

10. A multi-media collaborative data processing system for graphically indicating the relative location of a plurality of users within a shared data collection, said data processing system comprising:

a plurality of terminals, each terminal having a display system and a user input device;

a network connecting said terminals for communication;

memory means for providing simultaneous access to said shared data collection by said plurality of users;

means for providing a display window at a terminal associated with a first user;

means for displaying in association with said display window a moveable control icon constrained to move along a line parallel to an edge of said display window;

means for displaying within said display window a portion of said shared data collection, wherein said portion of said shared data collection is selected in response to a position of said movable control icon along said line; and means for displaying a visual location cue along said line, said visual location cue indicative of a relative location of a corresponding portion of said shared data collection displayed at a terminal associated with a second user.

11. The multi-media collaborative data processing system for graphically indicating the relative location of a plurality of users within a shared data collection according to claim 10, wherein said means for displaying in association with said display window a moveable control icon comprises means for displaying in association with said display window a vertical scroll bar.

12. The multi-media collaborative data processing system for graphically indicating the relative location of a plurality of users within a shared data collection according to claim 10, wherein said means for displaying in association with said display window a movable control icon comprises means for displaying in association with said display window a plurality of vertical scroll bars and wherein said means for displaying a visual location cue comprises means for displaying a visual location cue along a second one of said plurality of vertical scroll bars indicative of a relative location of a corresponding portion of said shared data collection displayed at a terminal associated with a second user.

13. The multi-media collaborative data processing system for graphically indicating the relative location of a plurality of users within said shared data collection according to claim 11, wherein said means for displaying a visual location cue along said line comprises means for displaying a portion of said vertical scroll bar in a distinctive color associated with said second user.

14. A multi-media collaborative data processing system for graphically indicating the relative location of regions within a shared data collection which a user has temporarily prohibited other users from manipulating, said data processing system comprising:

a plurality of terminals, each terminal having a display system and a user input device;

a network connecting said terminals for communication;

memory means for providing simultaneous access to said shared data collection by said plurality of users;

means for providing a display window at a terminal associated with a first user;

means for displaying in association with said display window a moveable control icon constrained to move along a line parallel to a side of said display window;

means for displaying within said display window a portion of said shared data collection, wherein said portion of said shared data collection is selected in response to a position of said movable control icon along said line; and means for displaying a visual location cue along said line, said visual location cue indicative of a relative location of a region within said shared data collection which a second user has temporarily prohibited other users from manipulating.

15. The multi-media collaborative data processing system for graphically indicating the relative location of regions within said shared data collection which a user has temporarily prohibited other users from manipulating according to claim 14, further including means for altering an aspect of a cursor associated with said first user in response to said first user locating said cursor within said region within said shared data collection which said second user has temporarily prohibited other users from manipulating.

16. The multi-media collaborative data processing system for graphically indicating the relative location of regions within said shared data collection which a user has temporarily prohibited other users from manipulating according to claim 15, wherein said means for altering an aspect of a cursor associated with said first user comprises means for varying a shape of said cursor.

17. The multi-media collaborative data processing system for graphically indicating the relative location of regions within said shared data collection which a user has temporarily prohibited other users from manipulating according to claim 14, wherein said means for displaying in association with said display window a moveable control icon comprises means for displaying in association with said display window a vertical scroll bar.

\* \* \* \* \*